(12) United States Patent
Drew et al.

(10) Patent No.: US 7,340,408 B1
(45) Date of Patent: Mar. 4, 2008

(54) METHOD FOR EVALUATING CUSTOMER VALVE TO GUIDE LOYALTY AND RETENTION PROGRAMS

(75) Inventors: James Howard Drew, Boxborough, MA (US); Denkanikota R. Mani, Boxborough, MA (US); Andrew Louis Betz, III, Pepperell, MA (US); Piew Datta-Read, Acton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 513 days.

(21) Appl. No.: 09/593,118

(22) Filed: Jun. 13, 2000

(51) Int. Cl.
*G06Q 99/00* (2006.01)

(52) U.S. Cl. .......................... 705/10; 705/10; 705/11; 705/1

(58) Field of Classification Search ................ 705/1, 705/7, 10, 11
See application file for complete search history.

(56) References Cited

U.S. PATENT DOCUMENTS

| | | | |
|---|---|---|---|
| 5,966,695 A * | 10/1999 | Melchione et al. | 705/10 |
| 6,064,731 A * | 5/2000 | Flockhart et al. | 379/265.06 |
| 6,119,933 A * | 9/2000 | Wong et al. | 235/380 |
| 6,236,977 B1 * | 5/2001 | Verba et al. | 705/10 |
| 6,347,310 B1 * | 2/2002 | Passera | 706/25 |
| 6,349,290 B1 * | 2/2002 | Horowitz et al. | 705/35 |
| 6,411,936 B1 * | 6/2002 | Sanders | 705/10 |
| 6,411,961 B1 * | 6/2002 | Chen | 707/102 |

OTHER PUBLICATIONS

"SAS Institute expands partnerships with leading global organizations", Jan. 20, 2000, M2 Presswire.*
"Cincinnati Bell: Cincinnati Bell announces integrated churn management pilot", Feb. 2, 1998, M2 Presswire.*
"Are your customes profitable:", Oct. 1, 1996, Bank Marketing International, Lafferty Publiscations Ltd., No. 75.*
Hutton, J.L., "choice of parametric accelerated life and proportional hazards models for furvival data: sasymptotic results", Dec. 2002, Kluwer Academic Pulishers, vol. 8, No. 4, p. 375-93.*
Canfield, R.V., "Cost Optimization of periodic preventive maintenance", IEEETransactions on Reliability, Apr. 1986, vol. r-35, No. 1, p. 78-81. 14.*
"Are Your Customers Profitable?", Bank Marketing International, Oct. 14, 1996, Lafferty Publications Ltd.*
Canfield, "Cost Optimization of Periodic Preventice Maintenence", Apr. 1986, IEEE Transactions On Reliability, vol. R-35, No. 1.*
D.R. Mani, James Drew, Andrew Betz, Piew Datta, Statistics and Data Mining Techniques for Lifetime Value Modeling, KDD-99 Fifth ACS SIGKDD Conference on Knowledge Discovery & Data Mining, San Diego, CA, Aug. 14, 1999, pp. 94-103.

(Continued)

*Primary Examiner*—Akiba Robinson-Boyce (57) ABSTRACT

A method and apparatus for training a neural network to compute hazard functions for customers and analyzing hazard functions, both for an individual customer, and for set of customers to focus marketing techniques. The hazard function represents the likelihood of churn for a particular customer. The gain in lifetime value is also calculated for each customer which incorporates the present value of the customer with the future value of the customer if a new contract is entered. The overall shape of the hazard function, combined with the gain in lifetime value, specifies what marketing techniques are to be applied together with what additional incentives are to be offered to the customer in order prevent churn.

67 Claims, 7 Drawing Sheets

Gain in Lifetime value (GLTV)

GLTV = Increase in Remaining Lifetime X Expected revenue

GLTV for Segment = Σ LTG for customers in segment

OTHER PUBLICATIONS

D.R. Mani, James Drew, Andrew Betz, Piew Datta, Statistics and Data Mining Techniques for Lifetime Value Modeling, KDD-99 Fifth ACMS SIGKDD Conference on Knowledge Discovery & Data Mining, San Diego, CA, presentation, Aug. 17, 1999, pp. 1-27.

James Drew, D.R. Mani, Andrew Betz and Piew Datta, Pattern of Customer Exit in a Contract Based Subscription Service, CS/D&CB J. Customer Satisfaction, Dissatisfaction & Complaining Behavior, vol. 12, Jul. 1, 1999, pp. 138-144.

D.R. Mani, Andrew Betz, Piew Datta, and James Drew, Pattern of Customer Exit in a Contract Based Subscription Service, Conference on Customer Satisfaction, Dissatisfaction and Complaining Behavior, Presentation, Jun. 21, 1999.

James Drew, D.R. Mani, Andrew Betz and Piew Datta, Classical and Data Mining Method in Survival Analysis for LTV Management, 1999 Advanced Research Techniques (ART) Forum, Presentation, Jun. 14, 1999.

* cited by examiner

Gain in Lifetime value (GLTV)

GLTV = Increase in Remaining Lifetime X Expected revenue

GLTV for Segment = $\sum$ LTG for customers in segment

Fig. 5

METHOD FOR EVALUATING CUSTOMER VALVE TO GUIDE LOYALTY AND RETENTION PROGRAMS

BACKGROUND OF THE INVENTION

A. Field of the Invention

The present invention relates generally to loyalty and retention programs and, more particularly, to the use of data modeling to guide such programs.

B. Description of the Prior Art

Businesses today focus efforts on both generating new customers and retaining existing customers. Typically, companies tend to look only at when a customer's contract expires to engage in retention efforts, and they apply a standard marketing strategy for all customers without taking into account the customer's previous history with the company. By using this approach for customer retention, a company often wastes time with a customer who generates little revenue for the company, while not spending enough time trying to keep a customer who is expected to generate a lot of future revenue for the company. Further, a company may apply the same incentives to both categories of customers.

Another problem with this retention technique is that contract expiration is not the only time that a company should solicit the renewal of a contract. Sometimes it is better to contact the customer after a contract has been renewed, or further, not to contact the customer at all.

Figure 1:
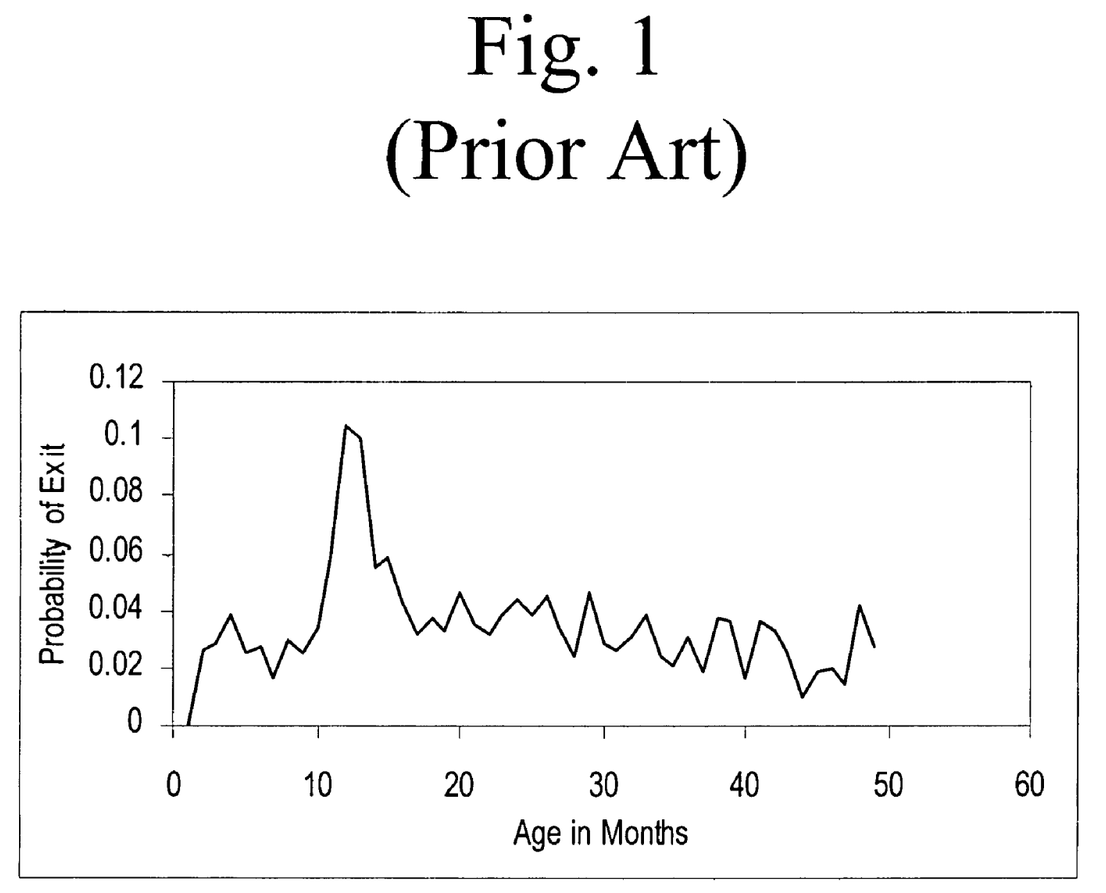
FIG. 1 is a graphic representation of a standard hazard function.

Some companies compare data models with new customer information to make determinations about how to approach certain aspects of a customer's account, including how long a customer will stay with the company, also known as survival. Some statistical approaches for the analysis of survival data deal with noting observations about "hazard functions" where the parameters for each technique vary. A hazard function is a formula representing the probability of a customer's termination of service based on previous behavior derived from a stored data set. FIG. 1 graphically represents an example of a hazard function. Hazard values, which represent the probability of a customer churning, or terminating the contract, are plotted along the y-axis. The age of the customer is plotted along the x-axis. The graph displays a spike at 12 months which demonstrates that this customer is more likely to cease business dealings with the company at 12 months, which coincides with the termination of that customer's contract.

Parametric survival models estimate the effects of covariates (subject variables whose values influence independent variables) by presuming a lifetime distribution of a known form, such as an exponential or Weibull. Although such models are popular for some applications, including accelerated failure models, the smoothness of these postulated distributions makes them inappropriate for survival data with contract expiration dates that provide natural spikes in the models for such data.

In contrast, the Kaplan-Meier method is "non-parametric" and provides hazard and survival functions with no assumption of a parametric lifetime distribution function. However, it is difficult to use this method to estimate the effects of covariates on the hazard and survival functions. Subsets of customers can generate separate Kaplan-Meier estimates, but sample size considerations generally require substantial aggregation in the data so that many customers are assigned the same hazard and survival functions regardless of their variation on many potential covariates.

The proportional hazard method assumes that each customer's hazard function is a multiple of a single baseline hazard. This multiplier uses functions that are generally linear which tends to assign extreme values to subjects with extreme covariate values. Further, the presumption of the proportional hazards is restrictive in that there may not be a single baseline hazard for each subject, and the form of that baseline's variation may not be well modeled by the time-dependent covariates or stratification that are the traditional statistical extensions of the original proportional hazard model.

Companies also use neural networks for predictive modeling and modeling relationships whose form is unknown. Because neural networks are non-linear, universal function approximators, they overcome the proportionality and linearity constraints imposed by the statistical approaches for modeling survival data. Neural networks have previously been used to predict actual tenure of a customer, but the information generated by these neural networks falls short in utilizing this information to focus marketing techniques as the information only speaks to the actual tenure of the customer, not the probable future tenure of the customer.

In addition to the models stated above, companies use the concept of customer lifetime value in order to value customers. Customer lifetime value (LTV) is the measure of the profit generating potential, or value, of a customer and is a useful tool in evaluating the high-value customers. LTV is composed of two independent components, value and tenure. Value incorporates the concepts of account revenue and fixed and variable costs. It is important in the prediction of LTV to incorporate the estimated differentiated tenures for every customer with a given service supplier, based on the usage, revenue, and sales profiles contained in company databases. Tenure prediction models generate, for a given customer, i, a hazard curve or a hazard function that indicates the probability $h_i(t)$ of cancellation at a given time, t, in the future. A hazard curve can be converted to a survival curve or a survival function, which plots the probability $S_i(t)$ of survival, or non-cancellation, at any time, t, given that customer, i, was active at time (t−e1), i.e., $S_i(t)=S_i(t-1)\times[1-h_i(t)]$ with $S_i(1)=1$. As such, the $LTV=\Sigma_{(t=1,T)}S_i(t)\times v_i(t)$ where $v_i(t)$ is the expected value of customer, i, at time, t, and T is the maximum time period under consideration. This LTV calculates customer specific estimates of total expected future profit based on customer behavior and usage patterns.

One of the shortcomings of using valuation by revenue and LTV is that customer valuations by revenue and LTV ignore the potential effects of company actions, particularly retention and service actions.

It is therefore desirable to provide techniques that overcome the limitations of existing methods to calculate probabilities of tenure of a customer to focus marketing techniques.

SUMMARY OF THE INVENTION

To overcome the limitations of existing techniques to model data, and in accordance with the purpose of the invention, as embodied and broadly described herein, methods and systems consistent with the invention includes a method for evaluating customer value to guide loyalty and retention programs including calculating an individual customer's tenure based on attributes relating to a plurality of current customer accounts; generating a hazard function for each of a plurality of new customers to determine probability of churn based the individual customer's tenure; calculating a gain in lifetime value for each of the plurality of new customers; and using at least one of the hazard function and gain in lifetime value for each of the plurality of new customers to focus loyalty and retention programs.

It is to be understood that both the foregoing general description and the following detailed description are exemplary and explanatory only and are not restrictive of the invention, as claimed. Advantages of the invention will be set forth in part in the description which follows, and in part will be obvious from the description, or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate an implementation of the invention and, together with the description, explain the goals, advantages and principles of the invention. In the drawings.

DETAILED DESCRIPTION

Reference will now be made in detail to an implementation consistent with the present invention. Wherever possible, the same reference numbers will be used throughout the drawings to refer to the same or like parts.

Methods and systems consistent with the present invention provide for a neural network which is generated using functions and attributes from customer account information and is used to generate hazard functions from which expected tenure of a customer can be determined and marketing techniques can be focused. The analysis of these hazard functions can direct marketing and retention efforts and can be explained with the example of cellular telephone service. The present invention can relate to any business and its referral to cellular telephone service is merely used as an example.

Figure 1A:
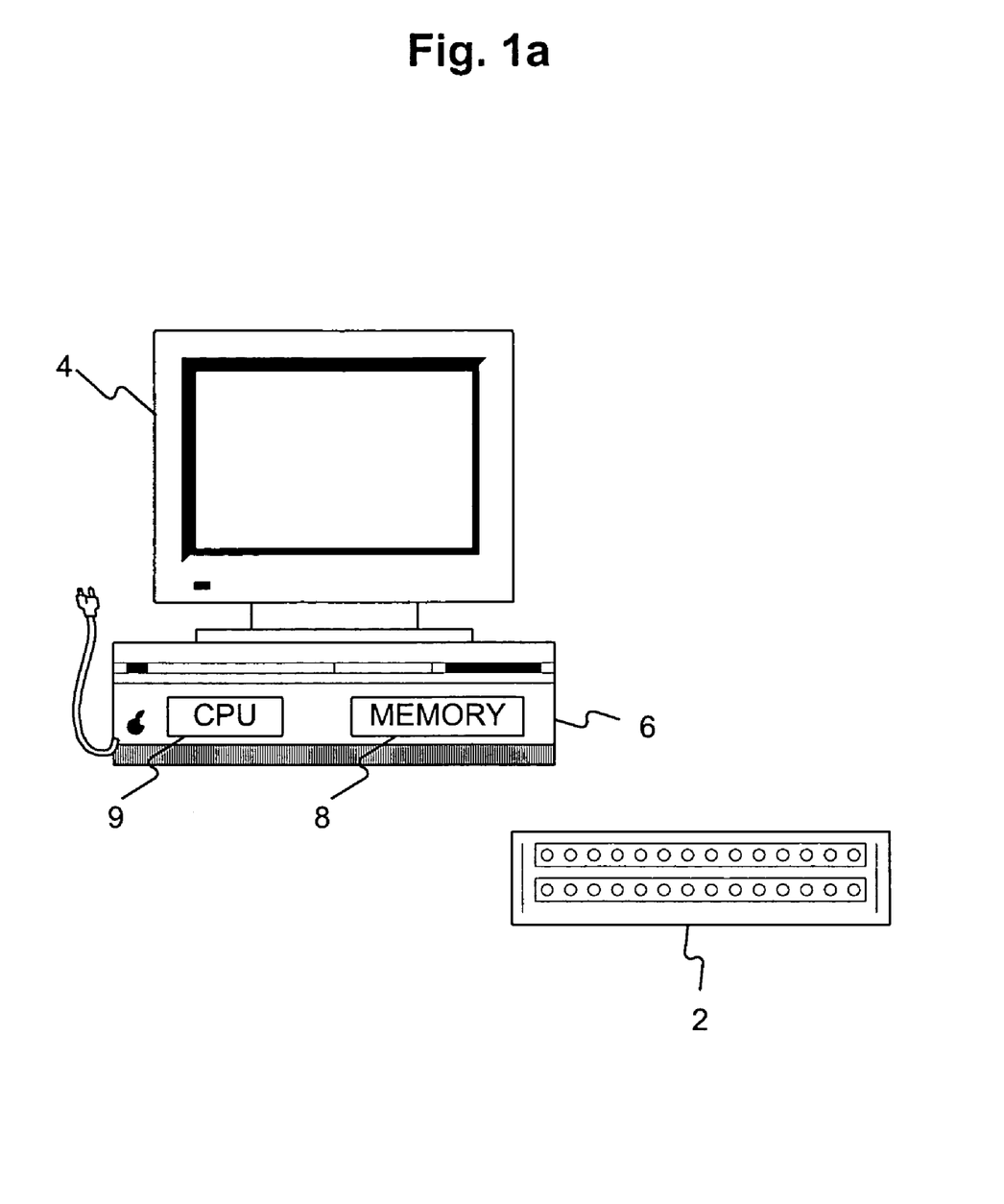
FIG. 1a is a block diagram of a system in which methods consistent with the present invention may be implemented.

FIG. 1a shows an example of a system in which the present invention may be implemented. The system comprises of an input device 2, display 4 and a computer 6 which includes a memory 8 and a central processing unit 9.

The system uses a multilayer feed-forward neural network which is useful in modeling relationships whose form is unknown because it is a non-linear, universal function approximator. It can overcome the proportionality and linearity constraints imposed by traditional survival analysis techniques and provide more accurate hazard and tenure models. With standard neural network fitting, a target is set for the mechanism to predict a target function with a complicated nonlinear function of covariates. A random sample of responses to a particular marketing campaign, for instance, might furnish targets in the form of 1's and 0's based on the parity of a customer response to the campaign.

The customer data for modeling has, in addition to a variety of independent input attributes, two important attributes: tenure and a censoring flag. TENMON is defined as the customer tenure in months and a CHURN flag indicates if the customer is still active or has terminated service. If CHURN=0, the customer is still active and TENMON indicates the number of months the customer has had service; if CHURN=1, the customer has cancelled and TENMON is the number of months of service at the time of the cancellation. In order to model customer hazard for the period [1,T], where T is the maximum period of time, for every customer, i, a target vector is created $\{h_i(1), \ldots, h_i(t), \ldots, h_i(T)\}$ with the following values (for $1 \leq t \leq T$):

$$h_i(t) = \begin{cases} 0 & 1 \leq t \leq \text{TENMON} \\ 1 & \text{CHURN}=1 \& \text{TENMON} \leq t \leq T \\ d_t/n_t & \text{CHURN}=0 \& \text{TENMON} < t \leq T \end{cases}$$

In this formula, $d_t$ is the number of cancellations in time interval t; $n_t$ is the number of customers at risk, i.e., the total number of customers with TENMON=t. The ratio $d_t/n_t$ is the hazard estimate used in the Kaplan-Meier survival estimator for the time interval indexed by t. The target hazard is set to 0 when a customer is active, 1 when a customer has cancelled, and to the Kaplan-Meier hazard if censored, meaning the period of time which the probability of churn is sought.

The vector $\{h_i(t)\}$ can be thought of as a raw hazard function for the i-th individual that the neural net will relate to the underlying covariates.

The dataset is then split into training, testing and holdout, or validation, datasets. The train and test datasets use the target vectors described above and are used to train the neural network and avoid overfitting. The holdout data are used to evaluate performance of the neural network.

Training the Neural Network

Figure 2:
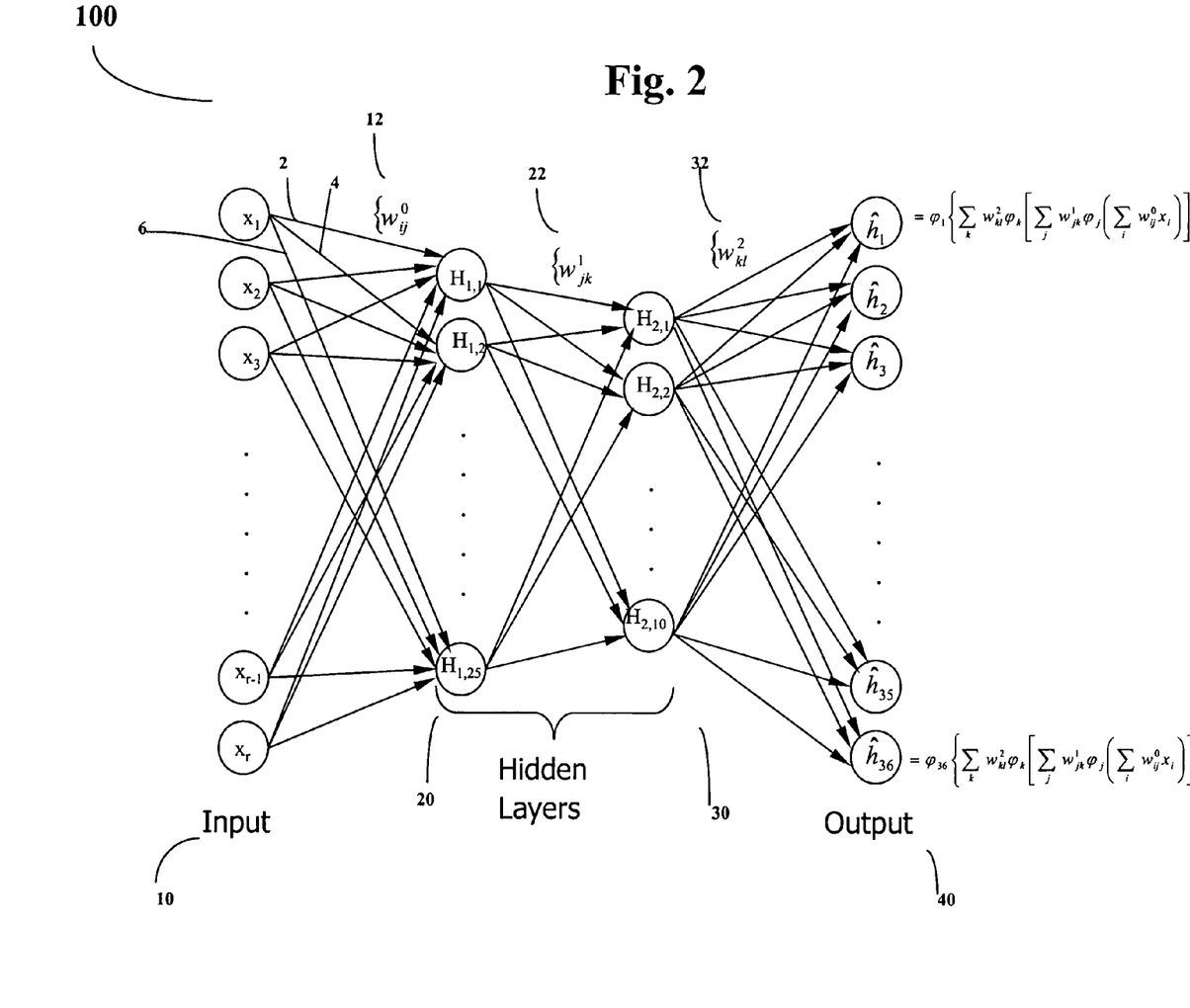
FIG. 2 is a schematic diagram of an example of a neural network.
Figure 2A:
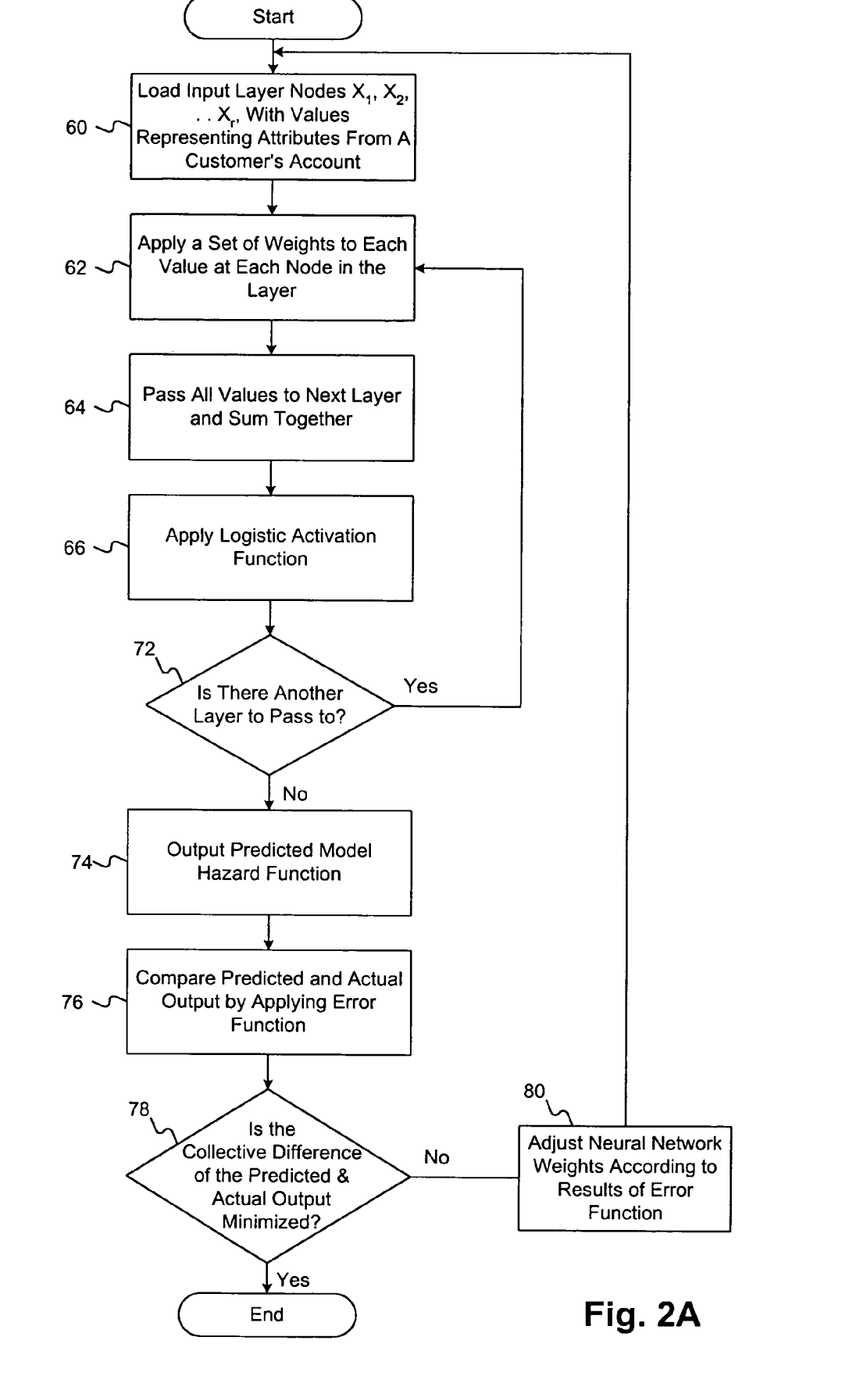
FIG. 2a is a flowchart representing a method of training a neural network in a manner consistent with the present invention.

FIG. 2 represents the layout of a neural network architecture implemented in a manner consistent with the present invention. FIG. 2a is a flow chart representing the method for training the neural network in FIG. 2. This method may be implemented in a computer program stored in memory and executed by a central processing unit. The neural network 100 is initially trained to generate a hazard function representing an individual customer within the company using data from existing customer accounts. The neural network 100 consists of nodes, or artificial neurons, that receive inputs through "connections" from other nodes that are essentially artificial resistors. Each such connection has a value known as a weight that is analogous to the resistance of a resistor. Each node sums the input signal values received from its inputs after being weighted by the connection, and then applies a nonlinear mathematical function to determine a value known as the internal activation value of the node. This value is then provided, after processing it through an output function, as the output of the unit and then applied, through the resistive connections, to units in the next highest layer. For example, the outputs of layer 10 are the inputs to layer 20.

Input layer 10, with its input units, is actually a dummy layer in which the internal activation value for each input node is simply set to an analog value provided as input to each node. Each input node is connected to the input of every unit in hidden layer 20. Arrow 2, 4 and 6 represent such connections.

Nodes in layers 20 and 30 are called "hidden nodes" because their values are not directly observable, unlike the nodes of the input layer 10 and output layer 40. The output of each node in hidden layer 20 is connected to the input of every node in the hidden layer 30. The output of each node in hidden layer 30 is connected to the input of every node in the output layer 40.

Connections between each layer are requested by sets of weights 12, 22 and 32 which are adjusted by a standard optimization routine, for example, steepest descent. The output of each output unit is provided to the rest of the system as the output of the neural network 100. In a feedforward network, the flow of information in network 100 is in one direction only, from input layer 10 to output layer 40. When information is applied to the input of network 100, it propagates to hidden layer 20, then hidden layer 30, and finally to output layer 40. The value of each output node represents the probability of churn for an individual customer, as a function of his tenure with the company.

Input layer 10 consists of multiple nodes $x_1, x_2, x_3, \ldots x_r$, and each node is assigned a value representing attributes from a customer's account (step 60). For cell telephone service, these attributes may include, but are not limited to, minutes of use for local, toll, peak and off-peak calls, total billing, detailed billing, previous balance, charges for access, toll, roaming and optional features, total number of calls, number of months in service, rate plan, contract type, date and duration, current and historical profitability and optional features. A set of weights 12 are assigned to each connection between the input layer and the first hidden layer. The weight assigned to each connection are then applied as data from each node $x_1, x_2, \ldots x_r$ passes through the connection to each node $H_{1,1}, H_{1,2} \ldots H_{1,25}$ within the first hidden layer 20 (step 62). These values are then input into the first hidden layer 20 of the neural network 100 and, at each node of the first hidden layer 20, all inputs are then summed together to form an internal activation value (v) of a node (step 64). These values are then passed through a logistic activation function $\phi(v)=(1/(1+e\hat{}-v)$ to transform the internal activation of a node to its output activation (step 66). The logistic activation function for output nodes also ensures that the predicted hazard rates are between 0 and 1. The output from the first hidden layer 20 is then sent to the second hidden layer 30 (step 72). The same procedure is followed as the data flows through the input, hidden and output layers of the neural network 100. As the output layer 40 is the final layer in the neural network 100, (step 72), a predicted model hazard function is output from the neural network (step 74). If, however, a neural network includes additional layers, processing returns to step 62.

A comparison between the predicted and actual output by applying a relative entropy or cross entropy error function $E=\Sigma_i f_i \Sigma k2\{y_{ik}\ln(y_{ik}/\mu_{ik})+(1-y_{ik})\ln(1-y_{ik}/1-\mu_{ik})\}$ (step 76). The system then determines if the collective difference of the predicted output and the actual output are minimized (step 76). If the difference is minimized, then the training is complete. If the difference is not minimized, the result from the relative entropy or cross entropy error function is used to generate the error value based on which the weights 12, 22 and 32 in the neural network 100 are adjusted (step 80). The variable $\mu_{ik}$ represents the predicted output value, or posterior probability, for the k-th unit of the i-th input case. The variable $y_{ik}$ is the target value, or actual value, for the k-th unit of the i-th case. The variable $f_i$ is the frequency of the i-th case. The process then returns to step 60 for the processing of another customer.

When the predicted and actual outputs are sufficiently close, the training of the neural network 100 is completed. No further adjustments to the set of weights 12, 22 and 32 are made.

The neural network 100 can be formatted with any number of attributes relating to customer account information within the nodes $x_1, x_2 \ldots x_r$ of the input layer 10 of the neural network 100. Further, the number of output nodes $\hat{h}_1, \hat{h}_2 \ldots \hat{h}_{36}$ can have a different value as they represent the number of months for which the hazard function is plotted.

Once the neural network has been trained and a hazard function model is generated, the network is then used to calculate a hazard function for each individual customer. For every customer, i, the neural network outputs a predicted hazard function $\{\hat{h}_i(t)\}$, $1 \leq t \leq T$. As such, the output of the neural network model consists of a predicted tenure for each individual customer, as well as that customer's estimated hazard function.

Generating Hazard Functions

Figure 3:
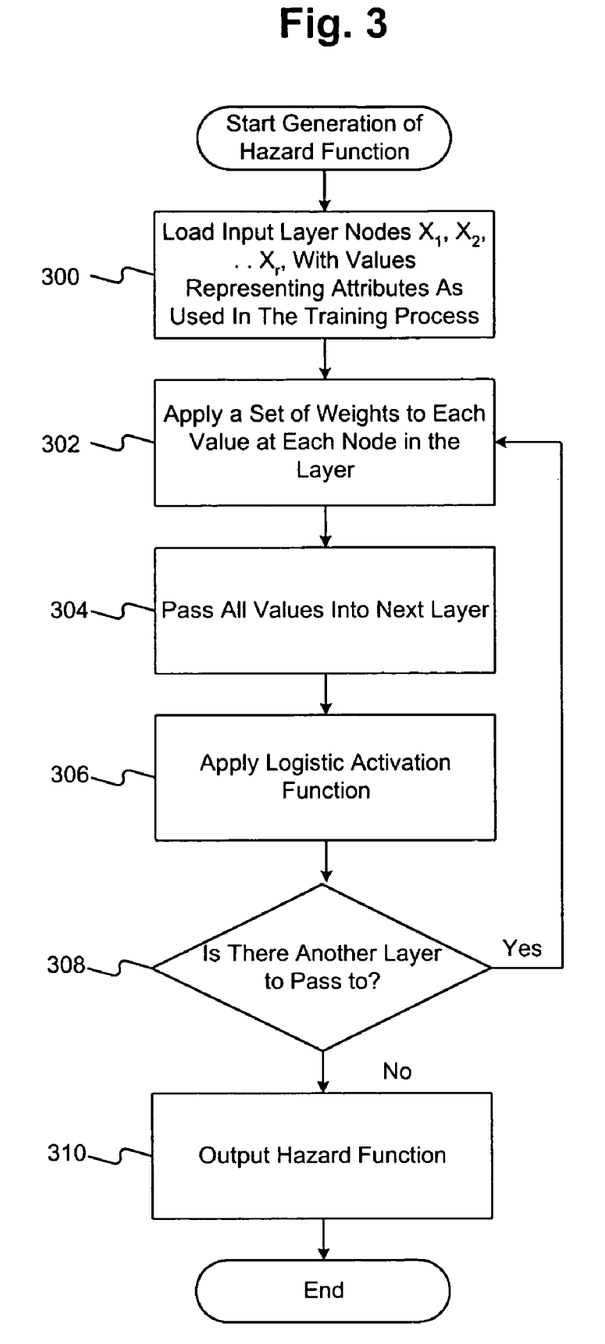
FIG. 3 is a flowchart representing a method of generating a hazard function for a particular customer in a manner consistent with the present invention.

After the training of the neural network 100 is completed, the neural network is then capable of generating hazard functions for existing customers. FIG. 3 is a flowchart representing the method used for generating a hazard function for a customer. Using the same set of attributes that were utilized in the training of the neural network 100, the account data for a particular customer is entered into the neural network and compared with the hazard function model by way of the adjusted set of weights 12, 22, and 32. In the same manner the attributes were loaded into the input layer 10 of the neural network 100, the analogous set of attributes are input into the input layer 10 (step 300). The set of weights 12 is applied to each connection between each node of the input layer 10 and the first hidden layer 20 (step 302). The values are then summed at each node of the first hidden layer 20 (step 304). The logistic activation function $\phi(v)=(1/(1+e\hat{}-v)$ is the performed at each node of the first hidden layer 20 (step 306). These values are then passed to each node of the second hidden layer 30 (step 308).

The set of weights 22 is then applied to each connection between each node of the first hidden layer 20 and the second hidden layer 30 (step 302). The values are then summed at each node of the second hidden layer 30 (step 304) and passed through the logistic activation function $\phi(v)=(1/(1+e\hat{}-v)$ (step 306). These values are then passed to each node of the output layer 40 (step 308). The set of weights 32 is then applied to each connection between each node of the second hidden layer 30 and the output layer 40 (step 302). The values are then summed at each node (step 304) and passed through the logistic activation function $\phi(v)=(1/(1+e\hat{}-v)$ (step 306). As the output layer 40 is the last layer of the neural network 100 (step 308), each node at the output layer 40 then outputs a value between 0 and 1 representing the probability of churn for that particular customer at a time t. When each of these values from the nodes in the output layer 40 are graphed, a hazard function is then generated and can be analyzed in order to determine what marketing techniques should be applied in order to maintain the customer account (step 310).

Clustering

Through the statistical clustering of the individual hazard functions discerned by the neural network 100, a number of basic patterns are generated based on the overall shape of the hazard functions. Within each of the basic patterns, hazard functions of individual customers are multiples of the reference hazard. Each individual's complete hazard over the whole time period calculated resulted in being a multiple of a single reference hazard.

The clustering of the hazard functions is performed, using k-means clustering. K-means clustering is a nonhierarchical method of clustering which initially takes the number of components of the population equal to the final required number of clusters. In this step, the final required number of clusters is chosen such that the points are mutually farthest apart. Next, it examines each component in the population and assigns it to one of the clusters to which its distance is minimum. The centroid's position is recalculated every time a component is added to the cluster and this continues until all the components are grouped into the final required number of clusters. It can be appreciated that other methods of clustering can be used to generate clusters of hazard functions.

K-means clustering can be performed by constructing a small number of statistics to indicate the shape of each hazard function for each customer. These may include the overall slope of the hazard function from 1 to 36 months; the relative size of any spike at the contract expiration time of 12 months, 24 months and so on; the terminal slope of the hazard curve; the average hazard rate as defined as the mean $[h_i(1), \ldots h_i(T)]$ where i represents an individual customer, t represents a particular point in time, and $h_i(t)$ represents the hazard value; the average hazard rate for the pre-contract expiration period (with 12 month contracts); the overall slope of the hazard curve calculated at $(h_i(t)-h_i(1))/T$; or the initial slope of the hazard curve calculated at $(h_i(9)-h_i(1))/9$. These and other parameters can be used to define the process for clustering hazard functions.

Figure 4:
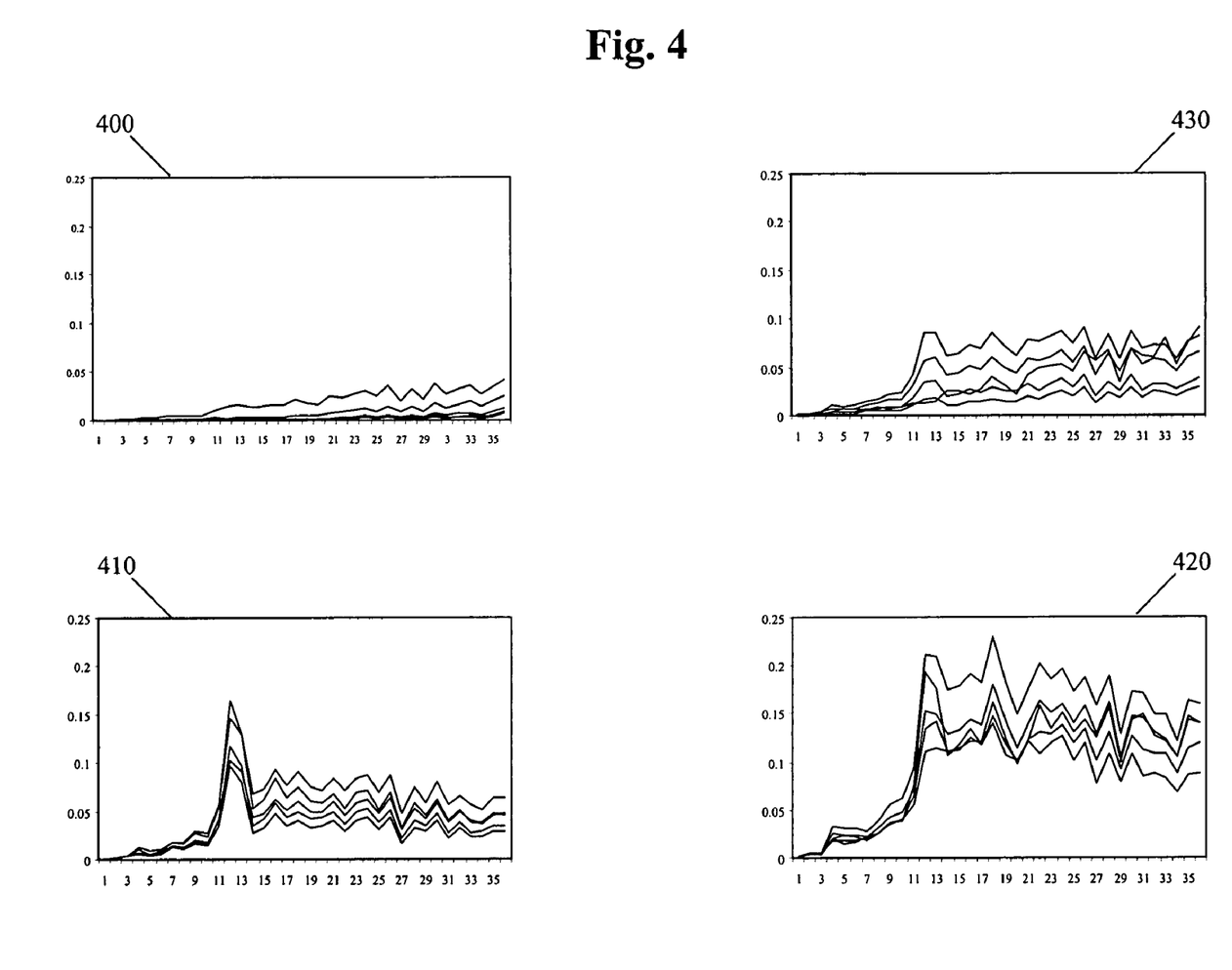
FIG. 4 are graphic representations of four types of clustering of hazard functions generated by a neural network in a manner consistent with the present invention.

The clustering process may result in 4 clusters as shown in FIG. 4 where the constituent hazard functions are all nearly multiples of each other. As such, the neural network hazard functions are effectively four groups of proportional hazard models.

Other clusters can be utilized to further narrow or broaden the marketing techniques as applied to particular customers in the cluster.

Marketing Techniques for the Hazard Clusters

The four clusters as shown in FIG. 4 constitute a useful customer segmentation for marketing techniques. These patterns have an important meaning for marketing and retention efforts and can be explained within the realm of cellular telephone service. The present invention can relate to any business and its referral to cellular telephone service is merely used as an example.

In each cluster, hazard functions are displayed which represent a broad spectrum of customers. Cluster 400 displays representative hazard functions for a first customer set. The overall shape of the five functions represented in cluster 400 indicate little activity along the entire function. There are no large spikes either at contract expiration or anywhere along the function and the probability of churn (represented on the y-axis) remains substantially the same throughout the time period measured (represented on the x-axis). The resultant hazard overall shape could be interpreted to represent customers of the "safety and security" set, who possess the cellular telephone service as an emergency or a convenience. The attributes of the customers in this cluster reveal a tendency to have a detailed bill with only a few calls per month. These customers generally tend to sign up for service for the purposes of emergency or safety situations and tend not to have high usage. Contacting these customers at contract expiration is not necessary as there is no propensity for the customer to terminate the contract after the contract period. In fact, contacting the customer at contract expiration is not recommended because it might alert the customer to look for alternate service providers, and thus potentially losing the customer to the competition.

Cluster 410 displays representative hazard functions for a second customer set. A large spike is evident at 12 months indicating a high probability of churn at contract expiration with the probability of churn remaining elevated in comparison with the first 12 month contract term.

The attributes of the customer set in this cluster comprise users who have a moderate flat-rate access charge accommodating all their calling needs. These customers tend to have higher usage than the "safety and security" set of customers and could be characterized, based on their attributes, tend to fall into one of two categories, zero charge for minutes of use and many calls per month, or no detailed bill with a lot of total charge. Based on the large spike at contract expiration, retention efforts should be concentrated during the pre-expiration period where a contract renewal may not be required.

Cluster 420 displays representative hazard functions for a third customer set. The hazard functions in cluster 420 evidence high probability of churn at the contract expiration period with high and increasing probability of churn post-expiration. The attributes of the customer set in this cluster tend to have high total charges and have rate plans whose flat rates do not fit their high calling volumes. These may well be customers who would be better served by a different rate plan; their high post-contract churn probabilities indicate that such improved plans are often obtained through alternative suppliers. As such, high intensity retention efforts should be made pre-expiration of the contract period with continued competitive offers in order to find a plan which fits the customer's calling needs.

Cluster 430 displays representative hazard functions for a fourth customer set. The overall shape of the functions indicates a scaled down version of cluster 420 with an elevation in probability of churn at contract expiration with continued elevated probability of churn post-expiration. These customers may also comprise customers with inappropriate contracts. As such, moderate pre-expiration retention effort is needed with the need for a new contract or continued contact in an attempt to find an appropriate plan for the customer's calling needs.

Contract expiration at (usually) 12 months is a crucial event for both the customer and the company. An organized company could, using the hazard clusters, construct a retention strategy by contacting and offering significant retention inducements, for example, a new phone or a better rate plan, to one portion of its customers, while offering lessor, or no, inducements to the other portions, and ignoring, or not contacting, yet another portion. Each of these strategies, together with other strategies, can be put in the same economic form; by combining contact costs and inducement costs into an aggregated concession cost, the issue becomes the size of the concession to offer to each customer.

Through the neural network, each customer has a unique hazard function and the cluster analysis indicates the form and desired outcome of the customer's retention approach. Analysis of each customer's hazard function, combined with knowledge of the expected revenue leads to an individual estimate of revenue gain to guide the retention effort.

Gain in Lifetime Value

In addition to evaluating at what point a company should contact a customer regarding their account, it is important to know the current and future value of the customer in order to determine the appropriate incentives to offer the customer. The modeling of customer lifetime value (LTV) has a number of applications including, but not limited to special services, for example, premium call centers and elite service, and offers based on customer LTV; targeting and managing unprofitable customers; segmenting customers, marketing pricing and promotional analysis based on LTV, and the sizing and planning for future market opportunity based on cumulative customer LTV. As such, in order to more accurately represent revenue generated by a customer, the customer's entire tenure should be taken into account together with any changes made to the customer's account including change in tenure value and a change in revenue.

The estimate of the expected revenue from customer is calculated by $ER_i = t_i^* R_i$ where $ER_i$ is the expected revenue, $t_i^*$ is the customer's new expected lifetime, and the monthly revenue ($R_i$) generated by customer, i, is effectively constant for all t. This quantity can be used to calculate an expected gain from a successful retention effort, and can, in turn, be used to rank customers for targeting special marketing techniques.

Figure 5:
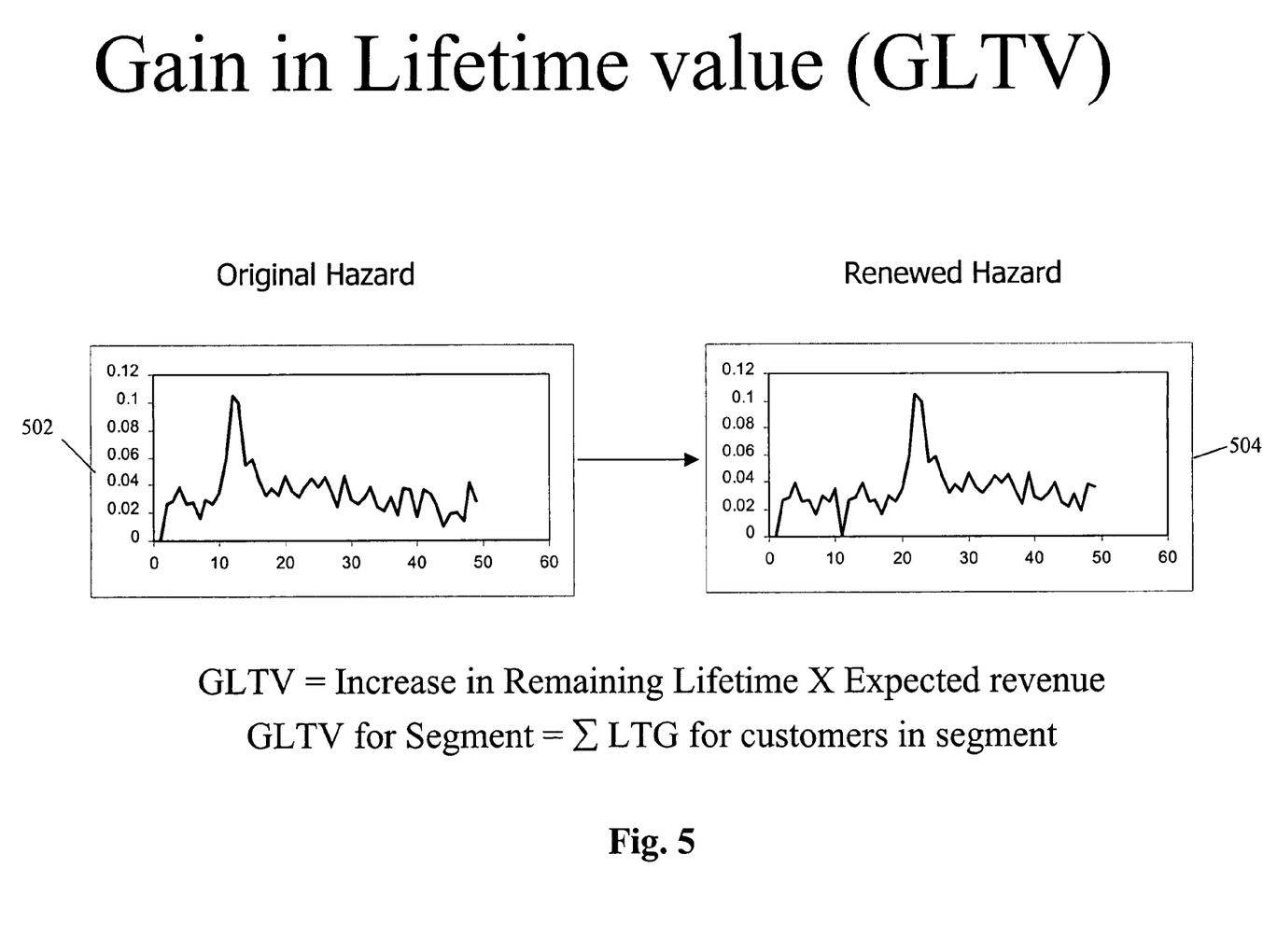
FIG. 5 is a graphic representation of a gain in lifetime value generated in a manner consistent with the present invention.

For example, assume customers are subject to a critical time period in their tenure when a decision is made concerning continuation of the individual's patronage. This time $t_0$ may be marked by the expiration of a contract or special promotion. Shortly before this critical time, say at time $t_0 - \Delta$, an attempt is made restore the customer's potential future behavior what was estimated at the beginning of his/her service period. That is, if this retention effort is successful, the customer's new hazard function is translated by the interval $t_0 - \Delta$. In FIG. 5, graph 502 shown an original hazard function based on a contract expiration date of $t_0 = 12$ months. When $\Delta = 2$ months (i.e. the retention effort is made two months before contract expiration), the customer's hazard function changes and that change is reflected in graph 504.

The new hazard function is called $\{h^*_i(t), t=1, 2, 3, \ldots\}$. This generates the corresponding survival function $\{S^*_i(t), t=1, 2, 3, \ldots\}$. The median remaining lifetime at time $t_0$ for the new hazard function can be calculated with regard to the original-hazard function using the formula $t^*_i - t_0$ to such that $\{S_i(t^*)\}/(S(t_0)) = 0.5$. Note that this is not necessarily the same as the time period by which the hazard function is translated. Then the estimated expected revenue $ER^*_i$ is calculated by the formula $ER^*_i = t^*_i R_i$. The gain in lifetime value (GLTV) for customer, i, from a successful retention effort is $GLTV_i = ER^*_i - ER_i(0)$. This quantity does not necessarily measure the actual gain in revenue that would be achieved through a successful customer retention effort. The customer's future revenue may be different from that observed in the past, particularly if the retention tactic involved the customer switching to a new rate plan. Further, it is not necessarily the case that a successful retention will result in a complete recapitulation of the original hazard function. The suggested GLTV calculation should be taken as a measure of the relative worth of a customer when information about their post-retention hazard is not available.

The GLTV concept has various operational uses. It serves as a guide for the company's interactions with individual customers when their retention may depend on a modified pricing plan or concessions. It also becomes the basis for segmenting customers into groups to which different retention efforts and concessions might be offered. The term "retention effort" is used as a collective term for the variety of company actions that occur throughout a customer's tenure aimed at the customer's ultimate retention. In addition to persuasion and negotiation targeted near a customer's contract expiration date, operations aimed at retention might include expedited customer care, pro-active equipment upgrades and other specially enhanced services.

With this information, retention efforts are varied by customer segment. The segments are generally based on a measure of customer value, so that the highest percentage customer segment is subject to one (high) level of retention effort, the next percentage is subject to a different (and slightly lower) effort, and so on until the lowest percentage receives yet another (very low or nonexistent) retention effort.

Other embodiments of the invention will be apparent to those skilled in the art from consideration of the specification and practice of the invention disclosed herein. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. A method for evaluating customer value to guide loyalty and retention programs comprising:
   generating, by a processing system, a hazard function model based on attributes relating to a plurality of current customer accounts;
   generating, by the processing system, a hazard function for a first existing customer, to determine probability of churn, based on the hazard function model and account data associated with the first existing customer and corresponding to the attributes;
   calculating a gain in lifetime value for the first existing customer based on a change in the hazard function resulting from a retention effort; and
   determining a focus for retention-based interactions with the first existing customer based on at least the hazard function, wherein determining the focus comprises clustering the hazard function for the first existing customer and hazard functions for a plurality of other existing customers so that the hazard functions are grouped together according to shape, each group representative of a customer set.

2. The method of claim 1, wherein calculating the gain in lifetime value includes:
   calculating a lifetime value based on original contract terms and revenue associated with the first existing customer; and
   calculating the gain in lifetime value based on a change in the hazard function resulting from a new contract period.

3. The method of claim 1, wherein determining the focus for retention-based interactions with the first existing customer includes:

analyzing the shape of the hazard function generated for the first existing customer; and specifying a set of marketing techniques based on the shape of the hazard function.

4. The method of claim 1, wherein determining the focus for retention-based interactions with the first existing customer includes:

specifying a set of incentives to offer the first existing customer based on the gain in lifetime value.

5. The method of claim 3, wherein specifying the set of marketing techniques based on the shape includes:

determining, based on the shape of the hazard function, there is no effect on churn of a contract expiration.

6. The method of claim 5, wherein specifying the set of marketing techniques includes:

taking no further steps to deter churn.

7. The method of claim 3, wherein specifying the set of marketing techniques based on the shape includes:

determining, based on the shape of the hazard function, that there is a small increase in probability of churn at contract expiration, with an elevated post-expiration churn.

8. The method of claim 7, wherein specifying the set of marketing techniques includes:

having a moderate pre-expiration effort where new contracts or continued contracts are the goal.

9. The method of claim 3, wherein specifying the set of marketing techniques based on the shape includes:

determining, based on the shape of the hazard function, that there is a large spike indicating high probability of churn at contract expiration and low probability of churn thereafter.

10. The method of claim 9, wherein specifying the set of marketing techniques includes:

concentrating effort on pre-expiration of contract where a contract renewal may not be required.

11. The method of claim 3, wherein specifying the set of marketing techniques based on the shape includes:

determining, based on the shape of the hazard function, that there is a large increase in probability of churn at expiration with high and increasing post-expiration probability of churn.

12. The method of claim 11, wherein specifying the set of marketing techniques includes:

specifying a high intensity pre-expiration effort with continued competitive offers to maintain the first existing customer.

13. The method of claim 4, wherein specifying the incentives includes:

determining that a value of the set of incentives offered to the first existing customer does not exceed the gain in lifetime value.

14. The method of claim 1, wherein determining the focus for retention-based interactions with the first existing customer includes:

determining, based on the overall shape of the clustered hazard functions, a focus for retention-based interactions for each customer set.

15. An apparatus for evaluating customer value to guide loyalty and retention programs comprising:

a computer, comprising:

a first calculating component for generating a hazard function model based on attributes relating to a plurality of current customer accounts;

a generating component for generating a hazard function for a first existing customer, to determine probability of churn, based on the hazard function model and account data associated with the first existing customer and corresponding to the attributes;

a second calculating component for calculating a gain in lifetime value for the first existing customer based on a change in the hazard function resulting from a retention effort;

a determining component for determining a focus for retention-based interactions with the first existing customer based on at least the hazard function; and a clustering component for clustering the hazard function for the first existing customer and hazard functions for a plurality of other existing customers so that the hazard functions are grouped together according to shape, each group representative of a customer set; and a display device displaying at least one of the hazard function, the gain in lifetime value for the first existing customer, and the focus for retention-based interactions with the first existing customer.

16. The apparatus of claim 15, wherein the second calculating component for calculating the gain in lifetime value calculates a lifetime value based on original contract terms and revenue associated with the first existing customer; and calculates the gain in lifetime value based on a change in the hazard function resulting from a new contract period.

17. The apparatus of claim 15, wherein the determining component includes:

an analyzing component for analyzing the shape of the hazard function generated for the first existing customer; and a specifying component for specifying a set of marketing techniques based on the shape of the hazard function.

18. The apparatus of claim 15, wherein the determining component includes:

a specifying component for specifying a set of incentives to offer the first existing customer based on the gain in lifetime value.

19. The apparatus of claim 17, wherein the specifying component for specifying the set of marketing techniques based on the shape includes:

a determining component for determining, based on the shape of the hazard function, there is no effect on churn of a contract expiration.

20. The apparatus of claim 19, wherein the specifying component specifies taking no further steps to deter churn.

21. The apparatus of claim 17, wherein the specifying component for specifying the set of marketing techniques based on the shape includes:

a determining component for determining, based on the shape of the hazard function, that there is a small increase in probability of churn at contract expiration, with an elevated post-expiration churn.

22. The apparatus of claim 21, wherein the specifying component specifies a moderate pre-expiration effort where new contracts or continued contracts are the goal.

23. The apparatus of claim 17, wherein the specifying component for specifying the set of marketing techniques based on the shape includes:

a determining component for determining, based on the shape of the hazard function, that there is a large spike indicating high probability of churn at contract expiration and low probability of churn thereafter.

24. The apparatus of claim 23, wherein the specifying component specifies concentrating effort on pre-expiration of contract where a contract renewal may not be required.

25. The apparatus of claim 17, wherein the specifying component for specifying the set of marketing techniques based on the shape includes:
 a determining component for determining, based on the shape of the hazard function, that there is a large increase in probability of churn at expiration with high and increasing post-expiration probability of churn.

26. The apparatus of claim 25, wherein the specifying component specifies a high intensity pre-expiration effort with continued competitive offers to maintain the first existing customer.

27. The apparatus of claim 18, wherein the specifying component includes a determining component for determining that a value of the set of incentives does not exceed the gain in lifetime value.

28. The apparatus of claim 15, wherein the determining component determines, based on the overall shape of the clustered hazard functions, a focus for retention-based interactions for each customer set.

29. A computer-readable medium including instructions, executable by a processor, for performing a method for evaluating customer value to guide loyalty and retention programs, the method comprising:
 generating a hazard function model based on attributes relating to a plurality of current customer accounts;
 generating a hazard function for a first existing customer, to determine probability of churn, based on the hazard function model and account data associated with the first existing customer and corresponding to the attributes;
 calculating a gain in lifetime value for the first existing customer based on a change in the hazard function; and
 determining a focus for retention-based actions based on at least the hazard function, wherein determining the focus comprises clustering the hazard function for the first existing customer and hazard functions for a plurality of other existing customers so that the hazard functions are grouped together according to shape, each group representative of a customer set.

30. The computer-readable medium of claim 29, wherein calculating the gain in lifetime value includes:
 calculating a lifetime value based on original contract terms and revenue associated with the first existing customer; and
 calculating the gain in lifetime value based on a change in the hazard function resulting from a new contract period.

31. The computer-readable medium of claim 29, wherein determining the focus for retention-based actions includes:
 analyzing the shape of the hazard function generated for the first existing customer; and
 specifying a set of marketing techniques based on the shape of the hazard function.

32. The computer-readable medium of claim 29, wherein determining the focus for retention-based actions includes:
 specifying a set of incentives offered to the first existing customer based on the gain in lifetime value.

33. The computer-readable medium of claim 31, wherein specifying the set of marketing techniques based on the shape includes:
 determining, based on the shape of the hazard function, there is no effect on churn of a contract expiration.

34. The computer-readable medium of claim 33, wherein specifying the set of marketing techniques includes:
 taking no further steps to deter churn.

35. The computer-readable medium of claim 31, wherein specifying the set of marketing techniques based on the shape includes:
 determining, based on the shape of the hazard function, that there is a small increase in probability of churn at contract expiration, with an elevated post-expiration churn.

36. The computer-readable medium of claim 35, wherein specifying the set of marketing techniques includes:
 having a moderate pre-expiration effort where new contracts or continued contracts are the goal.

37. The computer-readable medium of claim 31, wherein specifying the set of marketing techniques based on the shape includes:
 determining, based on the shape of the hazard function, that there is a large spike indicating high probability of churn at contract expiration and low probability of churn thereafter.

38. The computer-readable medium of claim 37, wherein specifying the set of marketing techniques includes:
 concentrating effort on pre-expiration of contract where a contract renewal may not be required.

39. The computer-readable medium of claim 31, wherein specifying the set of marketing techniques based on the shape includes:
 determining, based on the shape of the hazard function, that there is a large increase in probability of churn at expiration with high and increasing post-expiration probability of churn.

40. The computer-readable medium of claim 39, wherein specifying the set of marketing techniques includes:
 specifying a high intensity pre-expiration effort with continued competitive offers to maintain the first existing customer.

41. The computer-readable medium of claim 32, wherein specifying the incentives includes:
 determining that a value of the set of incentives does not exceed the gain in lifetime value.

42. The computer-readable medium of claim 29, wherein determining the focus for retention-based actions includes:
 determining, based on the overall shape of the clustered hazard functions, a focus for retention-based actions for each customer set.

43. A system for evaluating customer value to guide loyalty and retention programs comprising:
 means for generating a hazard function model based on attributes relating to a plurality of current customer accounts;
 means for generating a hazard function for a first existing customer, to determine probability of churn, based on the hazard function model and account data associated with the first existing customer and corresponding to the attributes;
 means for calculating a gain in lifetime value for the first existing customer based on a change in the hazard function;
 means for determining a focus for retention-based actions based on at least the hazard function;
 means for clustering the hazard function for the first existing customer and hazard functions for a plurality of other existing customers so that the hazard functions are grouped together according to shape, each group representative of a customer set; and
 means for displaying at least one of the hazard function, the gain in lifetime value for the first existing customer, and the focus for retention-based actions.

44. The system of claim 43, wherein the means for calculating the gain in lifetime value includes:
    means for calculating a lifetime value based on original contract terms and revenue associated with the first existing customer; and
    means for calculating the gain in lifetime value based on a change in the hazard function resulting from a new contract period.

45. The system of claim 43, wherein the means for determining includes:
    means for analyzing the shape of the hazard function generated for the first existing customer; and
    means for specifying a set of marketing techniques based on the shape of the hazard function.

46. The system of claim 43, wherein the means for determining includes:
    means for specifying a set of incentives to offer the first existing customer based on the gain in lifetime value.

47. The system of claim 45, wherein the means for specifying the set of marketing techniques based on the shape includes:
    means for determining, based on the shape of the hazard function, that there is no effect on churn of a contract expiration.

48. The system of claim 47, wherein the means for specifying the set of marketing techniques specifies taking no further steps to deter churn.

49. The system of claim 45, wherein the means for specifying the set of marketing techniques based on the shape includes:
    means for determining, based on the shape of the hazard function, that there is a small increase in probability of churn at contract expiration, with an elevated post-expiration churn.

50. The system of claim 49, wherein the means for specifying the set of marketing techniques specifies a moderate pre-expiration effort where new contracts or continued contracts are the goal.

51. The system of claim 45, wherein the means for specifying the set of marketing techniques based on the shape includes:
    means for determining, based on the shape of the hazard function, that there is a large spike indicating high probability of churn at contract expiration and low probability of churn thereafter.

52. The system of claim 51, wherein the means for specifying the set of marketing techniques specifies concentrating effort on pre-expiration of contract where a contract renewal may not be required.

53. The system of claim 45, wherein the means for specifying the set of marketing techniques based on the shape includes:
    means for determining, based on the shape of the hazard function, that there is a large increase in probability of churn at expiration with high and increasing post-expiration probability of churn.

54. The system of claim 53, wherein the means for specifying the set of marketing techniques specifies a high intensity pre-expiration effort with continued competitive offers to maintain the first existing customer.

55. The system of claim 46, wherein the means for specifying the incentives includes:
    means for determining that a value of the set of incentives does not exceed the gain in lifetime value.

56. The system of claim 43, wherein the means for determining the focus for retention-based actions includes:
    means for determining, based on the overall shape of the clustered hazard functions, a focus for retention-based actions for each customer set.

57. A method for evaluating customer value to guide loyalty and retention programs comprising:
    generating, by a multilayer feed-forward neural network, a hazard function for a first existing customer, to determine probability of churn, based on account data associated with the first existing customer and corresponding to a set of attributes;
    calculating, for the first existing customer, a gain in lifetime value based on a change in the hazard function resulting from a retention effort; and
    determining a focus for a retention-based program based on at least the hazard function, wherein determining the focus comprises clustering the hazard function for the first existing customer and hazard functions for a plurality of other existing customers so that the hazard functions are grouped together according to shape, each group representative of a customer set.

58. The method of claim 57 further comprising:
    implementing the programs based on the determined focus.

59. A method for evaluating customer value to guide loyalty and retention programs comprising:
    generating, by a processing system and for each of a plurality of customers, a hazard function to determine a probability of churn for each customer, the hazard function based on attributes relating to customer account information;
    identifying a temporal-based retention effort based on the hazard function for each of the plurality of customers;
    calculating, for each of the plurality of customers, an expected gain in value from the identified retention effort; and
    determining a focus for customer interaction based on the expected gain in value, wherein determining the focus comprises clustering the hazard function for each of the plurality of customers so that the hazard functions are grouped together according to shape, each group representative of a customer set.

60. The method of claim 59, wherein generating the hazard function comprises:
    generating the hazard function, based on a reference hazard function model, for each of the plurality of customers.

61. The method of claim 59, wherein the temporal-based retention effort comprises retention actions directed to each customer during a first time period and retention actions directed to each customer during a second time period occurring after the first time period.

62. The method of claim 1, wherein calculating the gain in lifetime value comprises calculating expected revenue multiplied by an increase in remaining lifetime resulting from the retention effort.

63. The method of claim 15, wherein the second calculating component calculates the gain in lifetime value by calculating expected revenue multiplied by an increase in remaining lifetime resulting from the retention effort.

64. The computer-readable medium of claim 29, wherein calculating the gain in lifetime value comprises calculating expected revenue multiplied by an increase in remaining lifetime resulting from a retention effort.

65. The system of claim 43, wherein the means for calculating a gain in lifetime value calculates the gain in lifetime value based on a change in the hazard function by calculating expected revenue multiplied by an increase in remaining lifetime resulting from a retention effort.

66. The method of claim 57, further comprising:
training the neural network to generate a hazard function model based on account data associated with a plurality of current customer accounts and corresponding to the set of attributes; and
wherein generating a hazard function includes generating a hazard function for an existing customer, to determine probability of churn, based on the hazard function model and the account data associated with the customer and corresponding to a set of attributes.

67. The method of claim 66, wherein training the neural network comprises loading an input layer of the neural network with values representing the set of attributes for the plurality of current customer accounts.

\* \* \* \* \*